2,737,515
Patented Mar. 6, 1956

2,737,515

SALTS OF SUBSTITUTED TETRAHYDROFORMYL PTEROYL AMINO ACIDS

John A. Brockman, Jr., Pearl River, N. Y., and Barbara Roth, Middlesex, N. J., assignors to American Cyanamid Company, New York, N. Y., a corporation of Maine No Drawing. Application June 30, 1951,
Serial No. 234,668

3 Claims. (Cl. 260—251.5)

This invention relates to new organic compounds. More particularly, it relates to imidazolinium salt forms of formyltetrahydropteroyl amino acids and a method of preparing the same.

In our copending application, Serial Number 159,151, filed April 29, 1950, of which the present application is a continuation-in-part, the synthesis and isolation of a formyltetrahydro-pteroylglutamic acid was disclosed which was active in promoting the growth of Leuconostoc citrovorum. The structure of the active material was represented by one of the following formulae, either tetrahydro-$N^{10}$-formylpteroylglutamic acid (I) or one of its ring tautomers (II), thus:

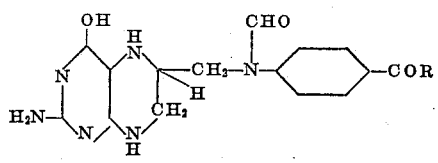

(I)

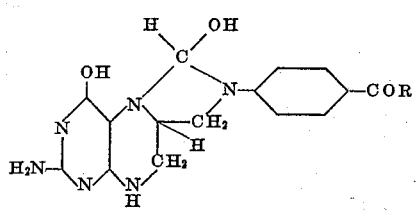

(II)

in which R is the radical of an amino acid. In the above mentioned application it was disclosed that the synthetic material lost activity for Leuconostoc citrovorum in acid at pH 2 but retained a biological activity similar to pteroylglutamic acid for Streptococcus faecalis R.

In our copending application, Serial Number 224,828, filed May 5, 1951, we disclosed that the synthetic citrovorum factor in its fully active form, 5-formyl-5,6,7,8-tetrahydropteroylglutamic acid, can be prepared by dissolving $N^{10}$-formyl- or $N^5,N^{10}$-diformylpteroylglutamic acid in an aqueous medium having a pH of from 7 to 14.

We have now found that quaternary salt forms of formyltetrahydropteroyl amino acids can be prepared by treating $N^5$-formyl- or $N^{10}$-formyltetrahydropteroyl amino acids with strong acids as described hereinafter.

These new quaternary salts are stable when dry. They are useful as a means of increasing the purity of crude or partially purified preparations of $N^5$-formyltetrahydropteroyl amino acids by a process which involves their formation and precipitation. They are also useful in that they unexpectedly possess more potent activity in reversing the toxicity of 4-aminopteroylglutamic acid for microorganisms and in animals than does pteroylglutamic acid.

The new compounds may be represented by the following formula or one of its tautomeric forms:

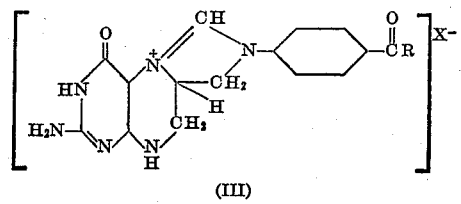

(III)

in which R is an amino acid radical and X is an anionic radical. As there are basic nitrogen atoms in the molecule other than the quaternary nitrogen atom these compounds also form simple addition salts with acids and such are included within the scope of the invention.

In preparing the compounds of the present invention a 5-formyl-5,6,7,8-tetrahydropteroyl amino acid, or its 10-formyl isomer or salts thereof with cations, are dissolved, for instance, in aqueous hydrochloric acid of 0.5 N concentration to about 12 N concentration. The new imidazolinium salts of the type shown in formula III above are formed. For example, in the case of the glutamic acid amide the formyltetrahydropteroylglutamic acid is dissolved in about 20 to 50 parts of cold 0.5 N hydrochloric acid and allowed to stand at room temperature. Upon cooling, the imidazolinium salt separates out as irregular diamond shaped crystals of the slightly hygroscopic chloride-hydrochloride monohydrate, which can be crystallized repeatedly by dissolving in concentrated hydrochloric acid and diluting to about 2 to 3 N hydrochloric acid, whereupon the chloride-hydrochloride is obtained in pure form. It is fairly stable to oxygen at an acid pH, but in dilute alkali it is rapidly oxidized by atmospheric oxygen. On anaerobic alkaline treatment it is converted back to 5-formyl-5,6,7,8-tetrahydropteroylglutamic acid, which is fully active in stimulating the growth of Leuconostoc citrovorum. When recrystallized from water or from 0.1 N hydrochloric acid, the salt is hydrolyzed and substances corresponding to the imidazolidine (II) or its internally compensated imidazolinium base tautomer are formed. These latter forms can be reconverted to the chloride-hydrochloride (III, X=Cl,+HCl) by treatment with hydrochloric acid 0.5 N to 12 N in strength. They can also be converted back to fully active 5-formyltetrahydropteroylglutamic acid on treatment in alkaline solution under anaerobic conditions. While the nature of the change produced by treatment with aqueous solutions of strong acids according to the present invention is not fully understood, it is believed to be an intramolecular rearrangement. The quaternary imidazolinium salt forms of the present invention are formed when the strong acid salts are relatively soluble in water and do not precipitate immediately from solution such as in the case of the hydrochloride, hydrobromide, sulfate, formate, etc. When the salt of the formyltetrahydropteroyl amino acid is insoluble in water as in the case of the nitrate or oxalate or when the conditions of the reaction are such as to result in immediate precipitation, the product recovered is the acid addition salt as described and claimed in a co-pending application of one of us, Serial Number 234,669 filed June 30, 1951. Apparently an interval of time, about 15 minutes, is required for the rearrangement of the formyltetrahydropteroyl amino acid to the quaternary imidazolinium form shown above. This form being less soluble than the simple addition salt is precipitated from solution and may be recovered as hereinafter described. The quaternary imidazolinium salts of the present invention can be differentiated from the acid addition salts of application, Serial Number 234,669 by comparison of chemical properties, polarographic behavior, spectrophotometric data and biological activity.

The process of the present invention may be carried out at a temperature of from 0° C. to about 100° C.

The following specific examples illustrate in greater particularity the process of the present invention.

*Example 1*

A solution of 5 parts of the calcium salt of 5-formyl-5,6,7,8-tetrahydropteroylglutamic acid (65% as the free acid) in 250 parts by volume of 0.5 N hydrochloric acid is allowed to stand several hours and is then cooled. The cream-colored solid which precipitates is filtered, washed with 1 N hydrochloric acid and acetone and dried under reduced pressure over calcium chloride. It weighs 1.5 parts. The hydrochloride salt is recrystallized by dissolving in concentrated hydrochloric acid at room temperature, clarifying with charcoal, and diluting with water to a concentration of 2 to 3 N hydrochloric acid. The melting point is 250°–251° C. with decomposition and preliminary yellowing. The product is inactive as a growth promoter for *Leuconostoc citrovorum*, but is one-third as active (3 times as active as folic acid) as 5-formyl-5,6,7,8-tetrahydropteroylglutamic acid in reversing the aminopterin inhibition of *S. faecalis* R. The ultraviolet absorption spectra: In 0.1 N sodium hydroxide (at 0 time), maxima: 255, 340; in 0.1 N hydrochloric acid, maximum: 355. The crystals on examination had the following structure: $N_L, 1.508 \pm 0.004; N_S, 1.84 \pm 0.01$. An analysis for carbon, hydrogen, nitrogen, chlorine and formyl agreed closely with the theoretical values for $C_{20}H_{23}N_7O_6Cl_2$.

*Example 2*

$N^{10}$-formyl-5,6,7,8-tetrahydropteroylglutamic acid (or an isomeric tautomer thereof) is prepared by heating 100 parts of pteroylglutamic acid in 600 parts 90% formic acid at 50°–90° C. for one hour. After cooling, platinum oxide catalyst is added and the mixture stirred rapidly under an atmosphere of hydrogen. The mixture is filtered after standing 24–48 hours. The filtrate is then poured slowly into 6,000 parts of ether. The precipitated compound is filtered and washed with ether.

One part of the above material is dissolved in 25 parts of water and 7 parts by volume of 5 N hydrochloric acid and adjusted to about 1 N by the addition of 2.5 parts by volume of concentrated hydrochloric acid. After cooling for some time, 0.37 part of a solid identical with that described in Example 1 is isolated by filtration.

*Example 3*

One part of crystalline $N^5$-formyl-5,6,7,8-tetrahydropteroylglutamic acid is mixed with 125 parts of water. Sulfur dioxide gas is bubbled into this mixture at room temperature until it is saturated. The solid goes into solution. After standing 24 hours, the sulfur dioxide is slowly removed under a very slight vacuum. A light yellow crystalline precipitate is thereby formed, consisting of long hair-like yellow needles. These are isolated and dried under reduced pressure after the excess sulfur dioxide has been removed. The product analyzes for the imidazolinium sulfite salt of $N^5$-formyl-5,6,7,8-tetrahydropteroylglutamic acid. On heating in water, this product loses the elements of $SO_2$ to give a further yellow product.

*Example 4*

The inner compensated imidazolinium salt, corresponding to Formula III, of $N^{10}$-(or $N^5$-) formyl-5,6,7,8-tetrahydropteroylglutamic acid also can be converted to the chloride-hydrochloride described in Example 1. It can be prepared as follows:

(1) One part of $N^{10}$-formyl-5,6,7,8-tetrahydropteroylglutamic acid (described in Example 2) is warmed to 40° C. with 38 parts by volume of 0.05–0.1 N hydrochloric acid and then cooled. The yellow material which precipitates is filtered and dried.

(2) The barium salt of $N^5$-formyl-5,6,7,8-tetrahydropteroylglutamic acid (2.5 parts) is dissolved in 100 parts of water by warming to 40° C. Then 5 N hydrochloric acid is added to pH 1.5. The solution is cooled and yields a heavy yellow precipitate which is isolated by filtration, washed and dried. This product weighs 0.533 g., melts with decomposition at 252°–253° C. It is inactive as a growth promoter for *Leuconostoc citrovorum*, but it is one-third as active as the starting material and about three times as active as pteroylglutamic acid and in reversing the aminopterin inhibition of *S. faecalis* R. The ultraviolet absorption spectra have, in 0.1 N sodium hydroxide, maxima at 248 and 332, and in 0.1 N hydrochloric acid, maxima at 256 and 325.

One part of the product described above in 5 parts of 5 N hydrochloric acid is cooled. A product identical with that described in Example 1 is isolated by filtration.

*Example 5*

A different tautomer of $N^{10}$-(or $N^5$-)formyl-5,6,7,8-tetrahydropteroylglutamic acid is prepared by treating 5 parts of the calcium salt of $N^5$-formyl-5,6,7,8-tetrahydropteroylglutamic acid with 200 ml. of 0.1 N hydrochloric acid. The pH is maintained at 0.9–0.5 by the addition of 5 N hydrochloric acid. After cooling, the precipitate of matted long yellow needles is filtered, washed with 0.1 N hydrochloric acid and dried. This material may be recrystallized from 0.1 N hydrochloric acid for further purification. It is converted to a compound identical with that described in Example 1 by treatment of one part with 5 parts of 2–3 N hydrochloric acid. On recrystallization from water it is converted to the yellow substance described in Example 4.

We claim:

1. Compounds of the group consisting of those having the general formula:

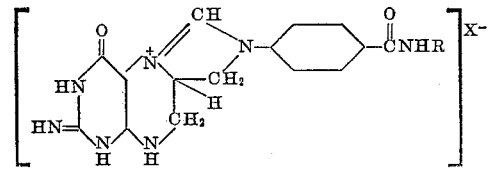

in which —NHR is the glutamic acid radical and X is an anionic radical.

2. A compound having the formula:

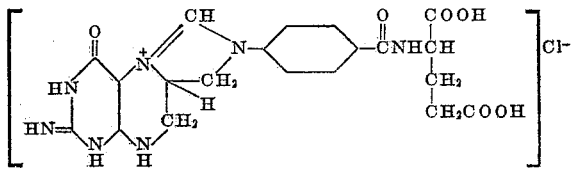

3. A compound having the formula:

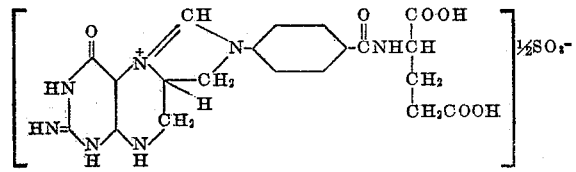

References Cited in the file of this patent

Sauberlich et al.: J. Biol. Chem., vol. 176, pp. 165–72 (1948).

Broquist et al.: Proc. Soc. Exp. Biol. Med., vol. 71, p. 549 (1949).